SUPERCONDUCTIVE TOTALIZER OR ANALOG-TO-DIGITAL CONVERTER

Filed Jan. 24, 1966

Inventor:
Milan D. Fiske,
by Richard A. Spear
His Attorney

United States Patent Office 3,458,735

Patented July 29, 1969

3,458,735

SUPERCONDUCTIVE TOTALIZER OR ANALOG-TO-DIGITAL CONVERTER

Milan D. Fiske, Burnt Hills, N.Y., assignor to General Electric Company, a corporation of New York Filed Jan. 24, 1966, Ser. No. 522,670

Int. Cl. H03k 3/38

U.S. Cl. 307—306 4 Claims

ABSTRACT OF THE DISCLOSURE

A superconductive device is disclosed in which a plurality of Josephson-type tunneling junctions are connected in series and subject to appropriately positioned electromagnetic control means to drive one or more of the junctions from the superconductive to the normally conductive condition. Depending upon the method of control, the device can be used either as a totalizer or as an analog-to-digital converter.

This invention relates to superconductive devices and more particularly to superconductive devices utilizing supercurrent tunneling junctions in such a way that either addition or analog-to-digital conversion can be affected.

The phenomenon of superconductive electron tunneling is one which is well known and occurs when superposed strips of superconductive metals are insulated from each other except for an area which is most often called the "tunneling junction" and which consists of an oxide layer of one of the two superconductive metals. Generally speaking, the thickness of this oxide film will not exceed 50 A. Specifically, it would be preferred that it not exceed 10 A. thickness for supercurrent tunneling and, in all cases, the oxide film must be continuous, that is, free of flaws so that electric shorting between the superposed metal strips or films cannot take place. When such a combination of elements is constructed and a source of current connected to the two metal films, electron tunneling occurs at the tunneling junction and different results will be effected depending upon the conditions superimposed upon the system. The present invention is concerned with a type of tunneling in which there is current flow through the tunneling junction without any voltage drop up to a critical current $I_J$ above which some voltage drop begins to occur. This voltage drop is approximately constant over an appreciable range of current; with larger currents, however, this voltage becomes proportional to the tunneling current. This type of behavior has been called in the art "Josephson superconductive tunneling" or "supercurrent tunneling."

It is a principal object of this invention to provide a superconductive device utilizing a plurality of supercurrent tunneling junctions in such a fashion that adding operations can be accomplished.

An additional object of this invention is to provide a superconductive device in which a plurality of supercurrent tunneling junctions are utilized to perform an analog-to-digital conversion.

Other objects and advantages of this invention will be in part obvious and in part explained by reference to the accompanying specification and drawings.

Briefly, the superconductive devices of this invention comprise a plurality of series-connected supercurrent tunneling junctions which are connected in series with a source of direct current and with primary electrical resistor means, which resistor means is of sufficiently large magnitude that a circuit of substantially constant current flow is created. Adjacent the plurality of series-connected tunneling junctions is electromagnetic control means which is capable of driving the junctions from the superconductive to the normally resistive condition during operation of the device.

Figures 1, 2, 4:
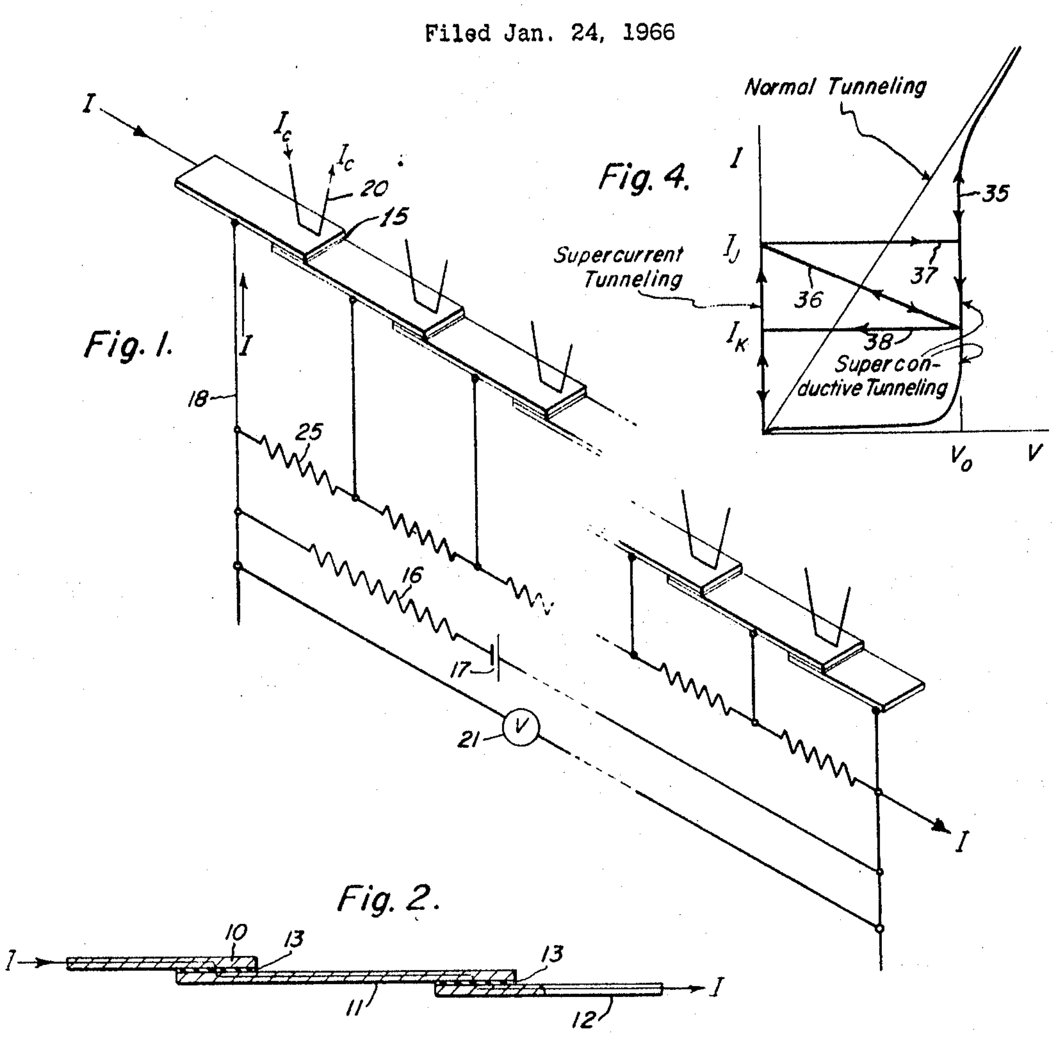
FIG. 1 is a diagrammatic perspective view of a superconductive device with a portion removed illustrating the manner in which an adding function can be accomplished.
FIG. 2 is a cross-sectional side elevation of junctions arranged in accordance with this invention illustrating the manner in which current flow occurs through the device.
FIG. 4 is a graph of the current-voltage characteristics of a superconductive tunneling junction.

Construction and operation of the device can best be seen by referring to the drawings and reference is made first to FIG. 2. In this figure, two of the supercurrent tunneling junctions are shown in the manner in which they are constructed and, more particularly, the junctions are shown as being formed between thin films or strips 10, 11 and 12 of a suitable superconductive metal such as niobium, aluminum or tin. Other metals are also adequate for these purposes and are well known and recognized in the art. The junction is formed by providing an oxide film 13 between the metal films, as shown in the drawing, and this oxide film is generally composed of a compound oxide of some form of the metal strip. Current flow through the device occurs following the path I—I and passes through the junctions in the manner indicated. The compound oxide can be formed in situ by anodizing the metal in the desired location.

In FIGURE 4 is plotted the current I through a supercurrent tunneling junction as a function of the voltage drop V across it for two cases: Case A in which I is held substantially fixed by external circuit means irrespective of the value of V; and Case B in which I may be decreased by the appearance of V. In Case A, I may be increased from zero to a maximum value $I_J$ before any voltage drop occurs across the junction. As I is further increased, a voltage drop $V_0$ suddenly appears and remains approximately constant over an appreciable current range as shown in FIGURE 4. As I is further increased, the characteristic approaches asymptotically the linear I–V curve typical of tunneling in the normal, or non-superconductive state.

As I is now reduced from large values along path 35, V again remains constant as I decreases below $I_J$ until a lower value of current $I_K$ is reached, whereupon V goes suddenly to zero and remains as I is reduced to zero.

In Case B, the junction is shunted with a resistance comparable with its normal tunneling resistance with the result that the appearance or disappearance of voltage drop traces path 36 rather than the hysteretic path 37 and 38 of Case A.

Now the junction may be driven out of the supercurrent state not only by increasing I above the critical $I_J$, but also by applying an external magnetic field H to the volume of the junction. Thus, application of a field as small as a few gauss to a junction of typical dimensions, say 0.05 cm. by 0.05 cm., will destroy zero-voltage tunneling even though I is appreciably less than $I_J$. In Case A, the junction will remain in the non-zero superconductive tunneling state upon removal of the field; in Case B, it will return to the supercurrent state.

Turning now to FIGURE 1 of the drawings, there is shown a series arrangement which makes it possible for the device to be used as an adder. More particularly, the device comprises a plurality of series-connected supercurrent tunneling junctions 15 of the type shown in FIG.

URE 2, this series of junctions being formed by connecting a plurality of superconductive strips in the manner discussed in connection with FIGURE 2.

The plurality of series-connected supercurrent tunneling junctions 15 is connected in series with primary electrical resistor means 16 and a source of direct current 17, as by means of wires or electrical leads 18. The size of the primary resistor means 16 is so selected that the current I in the circuit is substantially constant during operation and of a magnitude somewhat less than $I_j$. Generally speaking, the size of primary resistor means 16 will be at least ten times larger than the total resistance encountered when all of the superconductive junctions 15 are in the normal tunneling condition.

Positioned operably adjacent the tunneling junctions are electromagnetic control means to subject each of the junctions to electromagnetic fields capable of driving them from the superconductive to the normally resistive condition. In FIGURE 1, the electromagnetic control means has been shown in the form of small wire 20 which is connected to suitable circuitry that can be operated with a current flow from a current source to create a magnetic field in the volume of the junction and to cause it to be driven into the normal tunneling condition. Thus, by energizing one or more of the electromagnetic control means, any number of junctions may be driven from the superconductive to the normal tunneling condition.

In order to perform an adding function, it is necessary to determine how many of the electromagnetic control means have been actuated and, therefore, how many of the tunneling junctions are no longer in the superconductive condition. This objective may be accomplished by supplying the circuit with means responsive to the voltage change which occurs in the circuit upon one or more of the tunneling junctions becoming resistive. One way in which this end result may be accomplished is by connecting a voltage-responsive device, such as a voltmeter, across the series of tunneling junctions. Since the voltage drop across any junction is either zero or $V_0$, the same for all junctions, the total voltage drop across the plurality of junctions will be directly proportional to the number of normal tunneling junctions and hence to the number of electromagnetic control means which have been actuated. It is obvious that other voltage-responsive means than a voltmeter can be utilized and that the output voltage can, in fact, be connected to other circuitry to cause operation thereof when some predetermined set number or combination of tunneling junctions 15 are driven from the superconductive into the normal tunneling condition.

The supercoductive device just described can therefore "count" the number of control means which have been actuated. As described, each junction operates in the previously described mode of Case A so that once its associated control means has been actuated, the zero-voltage drop has been replaced by $V_0$ whether the means remains actuated or not. Thus, only a pulse of control current is needed to "latch" the junction in the $V_0$ state. Accordingly, the device just described performs as a cumulative register totaling the number of means which have been actuated at one time or another. In order to "reset" the device to start counting anew, it is necessary only to reduce I momentarily to zero.

If the device is modified, as shown in FIGURE 1, by connecting a resistor means 25 in parallel with each of the series-connected junctions, the device may be so altered that it totalizes the number of control means actuated at each instant and not the total which have been actuated. If the resistor means 25 has a resistance comparable with or less than the normal tunneling resistance of a junction, operation of the junction will be in the heretofore described mode of Case B. Consequently, there will be a voltage drop $V_0$ only when a control means is actuated and the modified operation follows.

Figure 3:
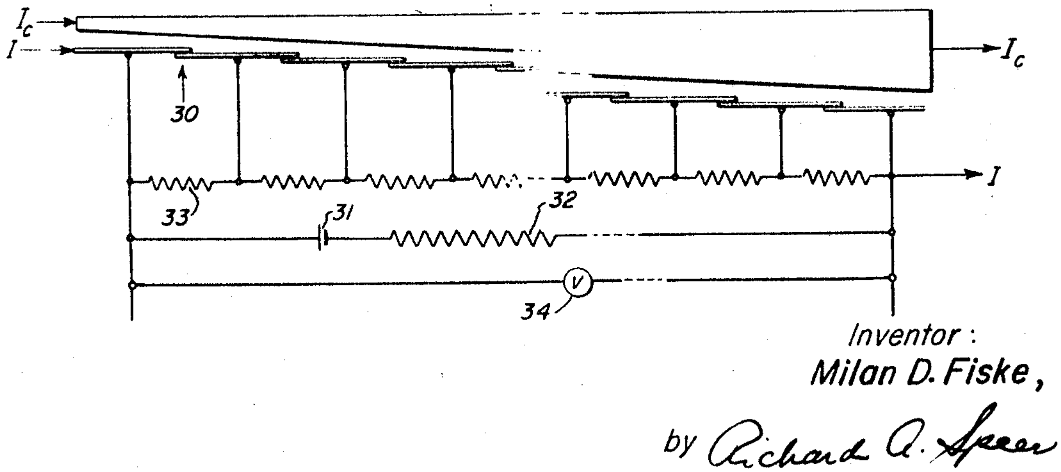
FIG. 3 is a side elevation with a portion removed of a device constructed according to this invention which can perform an analog-to-digital conversion.

FIGURE 3 shows a modified form of the superconductive device in which a plurality of series-connected tunneling junctions 30 are located adjacent electromagnetic control means comprising an electrical conductor which is of continuously increasing cross-sectional size from one end to the other in the region where adjacent the junctions. The remainder of the circuit used in conjunction with the tunneling junctions is identical to that described in connection with FIGURE 1. Specifically, in the circuit the source of D-C current 31, primary resistor means 32 and a plurality of secondary resistor means 33, connected in shunting arrangement with the junctions 30, are connected in series with the source of direct current 31 and the primary resistor means 32. Suitable means 34 are provided to determine changes in voltage drop across the plurality of junctions.

In operation, the device of FIGURE 3 has its electromagnetic control means connected to a source of direct current which flows along the path $I_c$—$I_c$, as indicated in the figure. Since the control means increases in cross-sectional dimensions from one end to the other, the intensity or magnitude of the magnetic field produced by $I_c$ varies for each of the junctions along the series. Thus, the first of the junctions adjacent the control means where it is of the smallest diameter, is subjected to a greater magnetic field than is the last of the junctions where the control conductor is of comparatively larger cross-sectional size. When a control current of unknown magnitude is introduced through the control conductor, some number of junctions will be driven into the normal tunneling condition. By then determining this number, as by means of voltmeter 34, it is possible then to know the magnitude of the unknown control current. Thus, in analog quantity, i.e., the current flowing through the control conductor is measured in digital form.

Although the present invention has been described in connection with preferred embodiments, it is to be understood that modifications and variations may be resorted to without departing from the spirit and scope of the invention, as those skilled in the art will readily understand.

What I claim as new and desire to secure by Letters Patent of the United States is:

1. A superconductive device comprising (1) a circuit including (a) a plurality of series-connected supercurrent tunneling junctions, each junction comprising a first conductor, an insulator, and a second conductor in a sandwich-like arrangement with the insulator in the form of an electron-permeable continuous film disposed between and separating the first and second conductors;

(b) a source of direct current connected in series with said tunneling junctions;

(c) primary electrical resistor means connected in series with said tunneling junctions and with said source of direct current, said resistor means being of a size such that the current in the cicuit is substantially constant during operation of said superconductive device;

(2) electromagnetic control means positioned operably adjacent said tunneling junctions to subject said junctions to electromagnetic fields capable of driving said junctions from the superconductive to the normal tunneling condition; and (3) means operatively associated with said circuit to determine the number of junctions that become normally resistive tunneling during operation of said device.

2. A superconductive device as defined in claim 1 wherein said circuit additionally includes an individual secondary resistor means each connected in electrical parallel with each of said junctions and with each other to form a series connection of resistors which series connection is connected in parallel with said primary resistor means.

3. A superconductor device as described in claim 1 wherein each of said tunneling junctions has an individual electromagnetic control means.

4. A superconductive device as described in claim 1 wherein said electromagnetic control means is mounted operably adjacent said series of junctions and comprises an electrical conductor which is of continuously increasing cross-sectional size from one end to the other in the region where adjacent said junctions.

References Cited

UNITED STATES PATENTS

| | | | |
|---|---|---|---|
| 3,047,743 | 7/1962 | Brennemann | 307—245 |
| 3,056,073 | 9/1962 | Mead | 317—234 |
| 3,116,427 | 12/1963 | Giaever | 307—245 |
| 3,178,594 | 4/1965 | Pollack | 307—212 |
| 3,191,168 | 6/1965 | Barrett | 340—347 |
| 3,196,427 | 7/1965 | Mann et al. | 340—347 |
| 3,204,211 | 8/1965 | Crittenden et al. | 338—32 |
| 3,281,609 | 10/1966 | Rowell | 307—88.5 |
| 3,327,303 | 7/1964 | Hughes | 340—347 |
| 3,363,200 | 1/1968 | Jaklevic et al. | 332—51 |
| 3,370,210 | 2/1968 | Fiske | 317—235 |

ARTHUR GAUSS, Primary Examiner

R. C. WOODBRIDGE, Assistant Examiner

U.S. Cl. X.R.

307—212, 245, 298, 306; 338—32; 340—347